United States Patent [19]

Shimomura

[11] 4,053,911
[45] Oct. 11, 1977

[54] LIGHT-RECEIVING DEVICE FOR USE WITH THE EXPOSURE METER IN SINGLE LENS REFLEX CAMERA

[75] Inventor: Jun Shimomura, Tokyo, Japan
[73] Assignee: Nippon Kogaku K.K., Tokyo, Japan
[21] Appl. No.: 642,335
[22] Filed: Dec. 19, 1975
[30] Foreign Application Priority Data
  Dec. 27, 1974  Japan .................................... 49-148855
[51] Int. Cl.² ............................................ G03B 19/12
[52] U.S. Cl. ....................................... 354/152; 354/59
[58] Field of Search ............... 354/156, 152, 153, 154, 354/155, 23, 59

[56] References Cited

U.S. PATENT DOCUMENTS

| | | | |
|---|---|---|---|
| 3,643,575 | 2/1972 | Ono | 354/23 |
| 3,779,146 | 12/1973 | Frankner | 354/152 X |
| 3,842,424 | 10/1974 | Tsunekawa | 354/152 X |

FOREIGN PATENT DOCUMENTS 1,344,571  1/1974  United Kingdom ................. 354/152

Primary Examiner—Edna M. O'Connor
Attorney, Agent, or Firm—Fitzpatrick, Cella, Harper & Scinto

[57] ABSTRACT

In a single lens reflex camera having a metering device, a principal mirror is provided for reflecting part of the light passing through an objective lens toward a finder optical system and for transmitting therethrough the remainder of the light. First optical means including a reflector member are disposed between the principal mirror and photographic film in inclined relationship with the optical axis of the objective lens. A condensing mirror extends between the image of an object formed by the objective lens and the first optical means and the light-receiving portion of the metering device. An image-forming half-lens is provided on the condensing mirror to condense the image of the object toward the light-receiving portion by cooperating with the condensing mirror. The optical axis of the half-lens is substantially coincident with the reflecting surface of the condensing mirror.

7 Claims, 5 Drawing Figures

FIG. 1 PRIOR ART
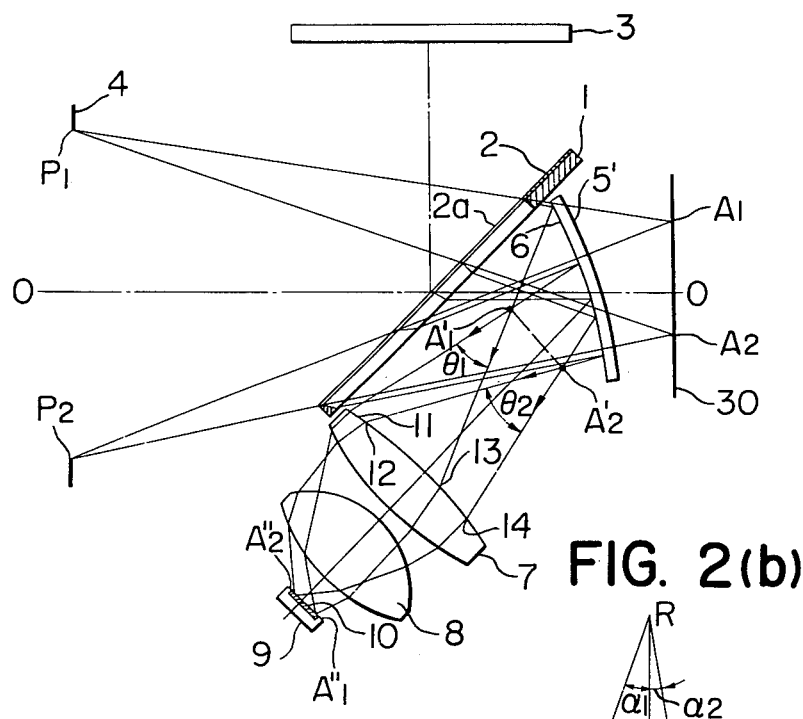
FIG. 2(a)
FIG. 2(b)
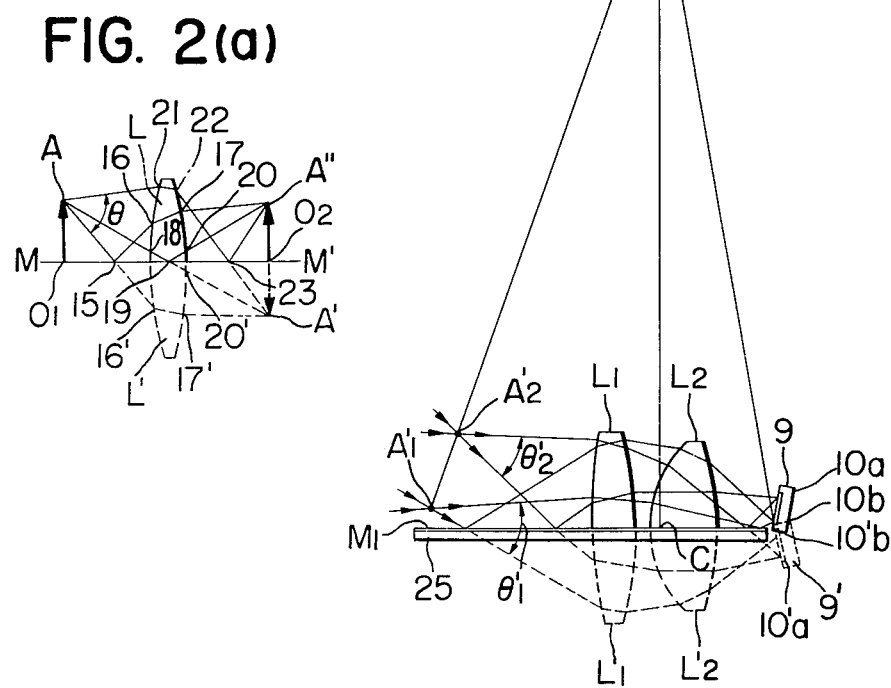

LIGHT-RECEIVING DEVICE FOR USE WITH THE EXPOSURE METER IN SINGLE LENS REFLEX CAMERA

BACKGROUND OF THE INVENTION

1. Field of the Invention

This invention relates to a single lens reflex camera having a metering device, and more particularly, to a light-receiving device for use with an exposure meter in such camera.

2. Description of the Prior Art

In a single lens reflex camera, it is known to provide a translucent portion in part of a principal mirror that reflects light passing through the objective lens of the camera toward a finder optical system, and to use a reflecting-condensing member to cause the light passing through the translucent portion to be condensed upon a photoelectric converter element provided at the bottom of a mirror box.

On the other hand, even in the so-called center-weighted metering system, whereby a substantially wide range on the picture plane is metered, two systems have been proposed to reduce the size of the photoelectric converter element and to permit such element to be disposed outwardly of the path of the metering light beam so as not to intercept such light beam, i.e., to dispose the photoelectric converter element at the mirror box bottom with sufficient space from the reflecting-condensing member. The first system employs a concave or a convex mirror of low curvature as the reflecting-condensing member so that a large conjugate image of the metering portion of the picture plane is formed as an aerial image at a location spaced from the reflecting-condensing member, whereby the aerial image is reduced in size by an image-forming lens and is directed to the photoelectric converter element. The second system employs as the reflecting-condensing member, a concave mirror of high curvature so that a small conjugate image is formed as an aerial image in the vicinity of the concave mirror, whereby this image is directed to the photoelectric converter element by an image-forming lens.

However, both of these systems embody a disadvantage in that they require the image-forming lens to be of large diameter and, accordingly, require the light-receiving device to be of large size.

More particularly, according to the first method, the aerial image itself is large in size and necessarily, the image-forming lens receiving the light therefrom must be of large diameter; while, according to the second method, a light beam ranging over a great angle is condensed on the aerial image so that a light beam ranging over a great angle is also emitted from the aerial image and therefore, the image-forming lens must be of a larger diameter in order for it to receive all of the emitted light.

SUMMARY OF THE INVENTION

I have conceived and contribute by the present invention a light receiving device for use with an exposure meter in a single lens reflex camera whereby I am able to overcome the foregoing disadvantages.

Accoring to my present invention, a single lens reflex camera having a metering device comprises a principal mirror for reflecting part of the light passing through an objective lens toward a finder optical system and for transmitting therethrough the remainder of the light. I provide first optical means which include a reflector member disposed between the principal mirror and the photographic film in inclined relationship with the optical axis of the objective lens. A condensing mirror extends between the image of an object formed by the objective lens and the first optical means and the light-receiving portion of the metering device. An image-forming half-lens is provided on the condensing mirror to condense the image of the object toward the light-receiving portion of the metering device by cooperation with the condensing mirror. The optical axis of the half-lens is substantially coincident with the reflecting surface of the condensing mirror.

The condensing mirror may be disposed closely adjacent to the image of the object and the light-receiving portion of the metering device may be disposed closely adjacent to the reflecting surface of the condensing mirror which has its reflecting surface facing the optical axis of the objective lens.

The reflector member of the optical means may be inclined with respect to the optical axis of the objective lens so that the image of the object may be formed downwardly with respect to the direction of the object and the camera.

The back side of the principal mirror provides a reflecting surface available as a part of the condensing mirror.

The condensing mirror may be provided by the back side of the principal mirror and a reflecting plate disposed on an extension of the end portion of the principal mirror and in proximity to said end portion. The reflecting plate has a reflecting surface facing the reflector member of the first optical means and an opaque back surface facing the objective lens to prevent light passing through the objective lens from passing below the end portion of the principal mirror.

The condensing mirror may be inclined with respect to the image plane of the image of the object and the light-receiving portion of the metering device may be disposed so that the light-receiving surface thereof may be coincident with the image plane of an image of the object formed by the condensing mirror and the half-lens.

There has thus been outlined rather broadly the more important features of the invention in order that the detailed description thereof that follows may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 1 is a cross-sectional view showing the construction of a light-receiving device according to the prior art;

FIG. 2(a) illustrates the principle of the present invention;

FIG. 2(b) is a cross-sectional view of the optical system illustrating details of the construction according to the present invention.

DESCRIPTION OF THE PREFERRED EMBODIMENTS

Figure 3:
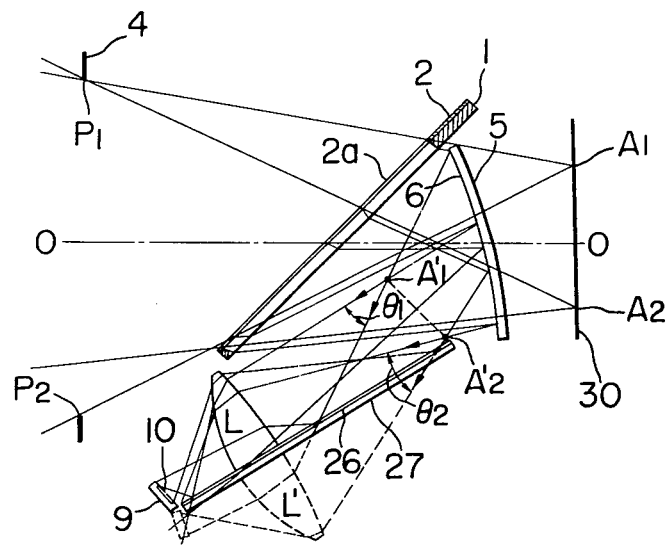
FIGS. 3 and 4 are cross-sectional views showing embodiments of the present invention, respectively.

FIG. 1 shows the construction of the light-receiving portion of a known single lens reflex camera. The portion 2a of the reflecting surface 2 of a principal mirror 1, on which impinges the light entering from the exit pupil 4 of an objective onto a film surface 30 within the range $A_1A_2$ thereof, is formed as a semi-transparent mirror which passes therethrough part of the incident light and reflects the remainder of the light toward a finder screen 3. Disposed between the principal mirror 1 and the film surface 30 is a concave mirror 5 which forms a first optical member of a light-receiving system and has a reflecting surface 6 for reflecting light passing through the principal mirror 1 obliquely downwardly and forwardly. The portions $A_1$, $A_2$ of the film surface 30 are focused as aerial images at positions $A'_1$, $A'_2$ by the mirror 5, and the light beams emitted therefrom and ranging over angles $\theta_1$ and $\theta_2$, respectively, enter a lens 7 of a light-receiving system secured to the bottom of the camera, and pass through the lens 7 and then through a lens 8 so that the light beams are further reduced and re-imaged as $A''_1$ and $A''_2$ on the light-receiving surface 10 of a photoelectric converter element 9. In this case, as already noted, the center-weighted metering, wherein the range $A_1A_2$ occupying a substantial area of the picture plane is metered, suffers from the disadvantage that the opening of the lens 7 must be sufficiently large so that the light beams ranging over the angles $\theta_1$ and $\theta_2$ and emitted from the images $A'_1$ and $A'_2$ may be introduced into the lens 7 at points 11, 13, 12 and 14 in accordance with the magnification of the mirror 5.

The present example corresponds to the case of the second system mentioned above, but if the curvature of the concave mirror 5 is much reduced and the range $A'_1A'_2$ is further increased, this will correspond to the case of the first system and the abovenoted disadvantage will obviously occur.

The principle of the present invention will now be described by reference to FIG. 2(a). Assume that there is a lens LL' having an optical axis $O_1O_2$ and that an object $O_1A$ is being imaged thereby at a position $O_2A'$. The path of the image light, as is apparent from the figure, is such that the light emitted from A and ranging over a solid angle $\theta$ follows the routes A-21-22-A', A-18-20'-A' and A-16'-17'-A' to gather at a point A'. Now assuming that this optical system is divided by a mirror MM' of axial length $O_1O_2$ containing the optical axis of the lens LL' and having the reflecting surface thereof facing upwardly (as viewed) and that the lens L' (shown in broken lines) is removed, then the light emitted from the point A and ranging over the solid angle $\theta$ travels along the routes A-21-22-23-A", A-18-19-20-A" and A-15-16-17-A" and gathers at A". In this case, the paths of the light beams reflected at reflection points 15, 19 and 23 on the mirror MM' are symmetrical with the path of the light passing through 16', 17' and 20' to A', about MM'. This holds true not only of the light passing from the point A, but also of the light rays passing from various points on the object $AO_1$ and thus, the image of the object $AO_1$ is produced at the position of $A''O_2$.

What is important here is that the light passing from the point A and ranging over the angle $\theta$, if it is designed so that all such light is gathered at the point A' by the lens LL', will all be gathered at the point A" without any loss of light when the absorption of light in the lens LL' and the mirror MM' is neglected. It will thus be seen that owing to the presence of the reflecting surface MM', the lens, if it only occupies the space of the portion L (shown in solid lines), can achieve just the same effect as that which would be achieved if the whole lens LL' were present.

Actual detailed construction of an embodiment of my invention will now be considered with reference to FIG. 2(b). The optical axis of lens halves $L_1$ and $L_2$ is contained in the reflecting surface $M_1$ of a condensing mirror 25. Light beams ranging over angles $\theta'_1$ and $\theta'_2$ are omitted from end points $A'_1$ and $A'_2$ of the aerial image. If lens portions $L'_1$ and $L'_2$ were present and the mirror 25 were eliminated, the light beams from $A'_1$ would be condensed at the end edge $10'b$ of the light-receiving surface of a photoelectric converter element at 9' while the light beam from $A'_2$ would likewise be condensed at $10'a$. As already noted, however, these light beams are actually condensed by means of the mirror 25 and lenses $L_1$, $L_2$ at the end edges $10b$ and $10a$, respectively, of the light-receiving surface of the photoelectric converter element at a position 9 which is symmetrical with the position 9' about the reflecting surface $M_1$ of the mirror 25. If the aerial image $A'_1A'_2$ is not perpendicular to the reflecting surface $M_1$, as is shown, it will be more advantageous to the metering to cause the aerial image $A'_1A'_2$ to be re-formed on the photoelectric converter element while maintaining it in perfect conjugate relationship and, therefore, it is advisable that the light-receiving surface $10'a - 10'b$ of the photoelectric converter element 9' be also slightly inclined with respect to the reflecting surface $M_1$, as is shown. The degree of the inclination may be obtained by:

$$\frac{\overline{A'_1A'_2}}{\overline{10'b\,10'a}} = \beta, \frac{\tan \alpha 1}{\tan \alpha 2} = \beta$$

where $\alpha 1$ is the angle formed by the aerial image plane $\overline{A'_1A'_2}$ with the plane RC containing the optical center of the lens system $L_1L_2$ and perpendicular to the optical axis of the lens system $L_1L_2$ and to the reflecting surface $M_1$, $\alpha 2$ the angle formed by the light-receiving surface $\overline{10'b\,10'a}$ of the photoelectric converter element 9' with the plane RC, and $\beta$ the magnification of the aerial image $A'_1A'_2$ with respect to the image $\overline{10'b\,10'a}$ on the light-receiving surface.

Thus, the light-receiving surface 10 may conveniently be disposed so that it is coincident with the plane of the aerial image $A'_1A'_2$ formed by the mirror 25 and the lens halves $L_1$, $L_2$.

In the case of FIG. 2(b), in order to increase the illumination on the light-receiving surface, it is more effective that the end edge $10'b$ of the light-receiving surface and accordingly, the end edge $10b$ of the light-receiving surface of the actual photoelectric converter element 9 is located as near as possible to the reflecting surface $M_1$.

Figure 4:
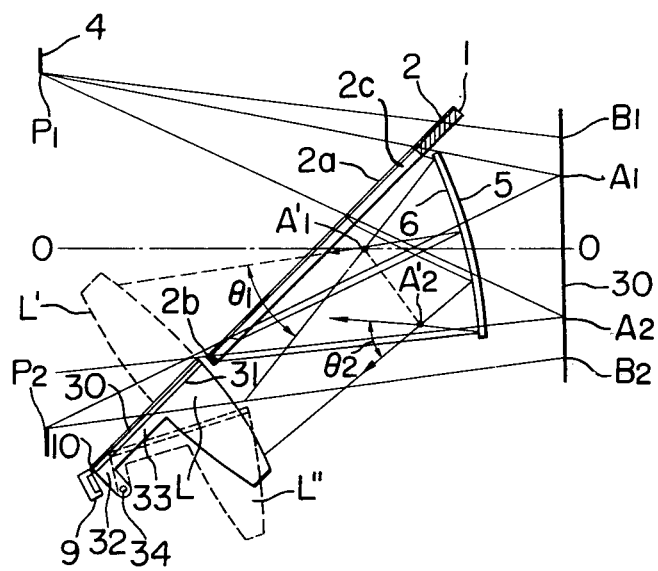

FIGS. 3 and 4 illustrate embodiments in which the construction shown in FIG. 2(b) is incorporated in an actual single lens reflex camera. In FIG. 3, a condensing mirror 27 disposed at the bottom of the mirror box of a single lens reflex camera has a half-lens L provided on the reflecting surface 26 thereof. The light beam passing from the exit pupil of an unshown objective lens through the translucent portion 2a of the principal mirror 1 toward the metering range $A_1A_2$ is caused to form a conjugate image $A'_1A'_2$ of the portion $A_1A_2$ by the concave mirror 5 which forms the first optical member of the light-receiving device, but the condensing mirror 27 has a reflecting surface 26 extending from the position of $A'_1A'_2$ to the light-receiving surface of the photoelectric converter element 9, and collects all the light from $A'_1A'_2$ toward the photoelectric element 9 as has hitherto been described. Thus, according to the present invention, the space below the mirror 27 shown as being occupied by L', which space would be necessary for the placement of the lenses 7 and 8 and for the passge of the light beam therethrough in the case of the conventional light-receiving system as shown in FIG. 1, is not needed and may be sufficiently utilized for other purposes. Of course, the concave mirror 5 is retracted out of the picture-taking light path by unshown means during photography.

Next, an embodiment which utilizes the back side of the reflecting surface of the principal mirror as a part of the condensing mirror will be illustrated. In FIG. 4, a mirror 31 disposed on the optical axis of a half-lens L is positioned so that it lies on an extension of the reflecting surface 2a of the principal mirror 1 during metering. The translucent portion 2a of the principal mirror 1 is formed by a translucent film on that side of a transparent substrate 2c which faces the objective lens, so that the reflected light from the concave mirror 5 enters the transparent substrate 2c and is thence reflected toward the lens L by the translucent film.

Therefore, in order to equalize the length of the light path from the concave mirror 5 via the back side of the principal mirror 1 to the light-receiving surface 10 and the length of the light path from the mirror 5 via the mirror 31 to the light-receiving surface, a transparent planar portion 33 having a thickness substantially equal to that of the transparent substrate 2c of the principal mirror 1 is provided on the reflecting surface of the mirror 31. The planar portion 33 supports the half-lens L at one end and is mounted at the other end for rotation about a pivot 34 by means of ears 32. An opaque coating 30 is provided on that side of the mirror 31 which faces the picture-taking lens. The photoelectric converter element 9 is secured to the bottom of the camera and the position thereof is determined with its positional relationship to the reflecting surface 31, the half-lens L and the aerial image $A'_1A'_2$ taken into account, as already described in connection with FIG. 2. As is well known, the principal mirror 1 and the concave mirror 5 are retracted out of the picture-taking light path defined by $P_1B_1$ and $P_2B_2$ during photography.

During the observation of the object when the principal mirror 1 is in its shown position, namely, during metering, the mirror 31 is also in its shown position so that the opaque coating 30 intercepts the light from the objective lens passing below the end 2b of the mirror 1 and thereby prevents any unnecessary light for metering from reaching the light-receiving surface 10. During photography, the mirror 31 is operatively associated with the mirror 1 or the concave mirror 5 and rotated about the pivot 34 to be retracted out of the picture-taking light path.

In the present embodiment, the back side of the principal mirror 1 is utilized as a part of the light reflecting mirror surface and therefore, the remaining length of the condensing mirror surface may be from the end 2b of the mirror 1 to the light-receiving surface 10 so that the dimensions of the mirror 31 can be greatly reduced. It is also possible to make the half-lens L, the planar portion 33 and the ear 32 integral by the use of plastics and thereby greatly reduce the weight thereof. Further, in the present embodiment, the position of the optical lens L is much closer to the picture-taking lens than its position in FIGS. 1 or 3 and this eliminates the necessity of bending the reflected light from the concave mirror at a sharp angle toward the bottom of the camera body, thus permitting the concave mirror to stand upright with respect to the optical axis of the unshown objective lens. When the aberrations caused by the concave mirror 5 are considered, this has a very good effect on the formation of the conjugate image $A'_1A'_2$ and is also useful to reduce the size of the concave mirror 5 with respect to the dimensions of the metering range $A_1A_2$.

In addition, that light which inversely enters from an unshown finder eyepiece and passes downwardly through the finder screen 3 and via the translucent portion 2a of the mirror 1 to the light-receiving system can hardly reach the light-receiving surface 10 of the photoelectric converter element 9 because the optical axis of the light-receiving system becomes approximately horizontal, and thus the accuracy of metering is increased.

Although, in the present embodiment, part of the light which is reflected by the concave mirror 5 to enter the principal mirror 1 is transmitted through the translucent portion 2a of this mirror to create a loss of light, the influence of such loss of transmitting light upon the metering accuracy may be neglected if the transmittivity of the translucent portion 2a is selected to several percent.

The translucent portion 2a of the principal mirror 1 need not always be a semi-transparent mirror, but instead may be a mirror surface formed with a plurality of small through apertures.

As will be appreciated from the foregoing, the present invention has the following advantages:

1. As compared with the prior art, a light-receiving optical system having the same metering performance can be incorporated in half the space heretofore required and, moreover, the size of the lens parts can be reduced by half.

2. Since the back side of the reflecting surface of the principal mirror 1 can be utilized as part of the condensing mirror, the size of the mirror 31 may be small and this can further simplify the construction.

3. The light-receiving system which, in spite of utilizing the back side of the principal mirror for the purpose of reflection, is less effected by the inversely incident light entering through the finder than the conventional system (Japanese Patent Publication No. 51253/1972) can be disposed in combination within the space behind the light-intercepting member for the harmful light from between the end of the principal mirror and the mirror box bottom to the light-receiving system, thus resulting in more efficient utilization of the space.

I believe that the construction and operation of my novel light receiving device will now be understood and that the advantages thereof will be fully appreciated by those persons skilled in the art.

I claim:

1. In a single lens reflex camera having a finder optical system, an objective lens, and a meter device including a light receiving portion:
   a. a principal mirror for reflecting part of the light passing through said objective lens toward said finder optical system and for transmitting therethrough the remainder of said light;
   b. first optical means including a reflector member and disposed between said principal mirror and the focal plane of the objective lens and in inclined relationship with respect to the optical axis of said objective lens;
   c. a condensing mirror extending between the image of an object formed by and between said objective lens and said first optical means and the light-receiving portion of said metering device; and
   d. an image-forming half-lens provided on said condensing mirror to condense said image of the object toward said light-receiving portion of said metering device by cooperating with said condensing mirror, the optical axis of said half-lens being substantially coincident with the reflecting surface of said condensing mirror.

2. A single lens reflex camera according to claim 1, wherein said condensing mirror is disposed closely adjacent to said image of the object and said light-receiving portion of said metering device is disposed closely adjacent to the reflecting surface of said condensing mirror.

3. A single lens reflex camera according to claim 1, wherein said reflector member of said optical means is inclined with respect to the optical axis of said objective lens so that said image of the object is formed in front of said reflector member and out of coincidence with the optical axis of said objective lens.

4. A single lens reflex camera according to claim 3, wherein said condensing mirror is disposed with the reflecting surface thereof facing the optical axis of said objective lens.

5. A single lens reflex camera according to claim 3, wherein said condensing mirror is disposed on an extension of the reflecting surface of said principal mirror during metering wherefor the back side of said principal mirror is a reflecting surface available as a part of said condensing mirror.

6. A single lens reflex camera according to claim 5, wherein said condensing mirror is composed of the back side of said principal mirror and a reflecting plate disposed on an extension of the end portion of said principal mirror and in proximity to said end portion, said reflecting plate having a reflecting surface facing said reflector member of said first optical means and an opaque back surface facing said objective lens to prevent the light passed through said objective lens from passing below said end portion of said principal mirror.

7. A single lens reflex camera according to claim 3, wherein said condensing mirror is inclined with respect to the image plane of said image of the object and said light-receiving portion of said metering device is disposed so that the light-receiving surface thereof is coincident with the image plane of an image of the object formed by said condensing mirror and said half-lens.

* * * * *